Dec. 28, 1965  L. D. AMDAHL ET AL  3,226,689
MODULAR COMPUTER SYSTEM MASTER DISCONNECT CAPABILITY
Filed July 3, 1961  3 Sheets-Sheet 1

INVENTORS:
RALPH J. KOERNER
LOWELL D. AMDAHL
WEAVER T. BRIAN, Jr.
ALFRED D. SCARBROUGH
EDWARD J. SCHNEBERGER

BY Arthur Freilich
ATTORNEY

INVENTORS
RALPH J. KOERNER
LOWELL D. AMDAHL
WEAVER T. BRIAN, Jr.
ALFRED D. SCARBROUGH
EDWARD J. SCHNEBERGER
BY Arthur Freilich
ATTORNEY

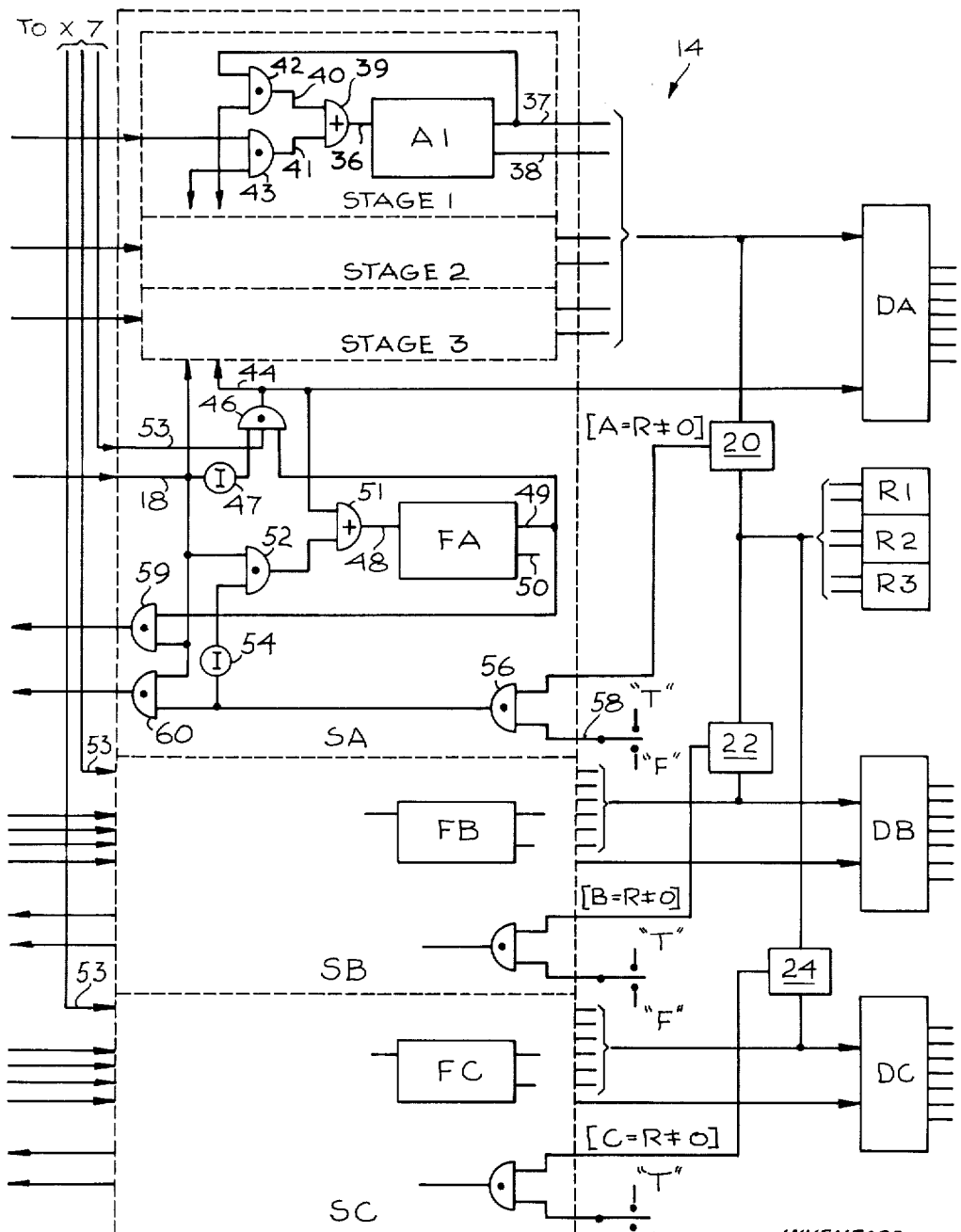

United States Patent Office 3,226,689
Patented Dec. 28, 1965

3,226,689
MODULAR COMPUTER SYSTEM MASTER
DISCONNECT CAPABILITY
Lowell D. Amdahl, Weaver T. Brian, Jr., and Alfred D. Scarbrough, Northridge, and Edward J. Schneberger and Ralph J. Koerner, Canoga Park, Calif.; said Amdahl, Brian, Scarbrough, and Schneberger assignors, by mesne assignments, to The Bunker-Ramo Corporation, Stamford, Conn., a corporation of Delaware
Filed July 3, 1961, Ser. No. 121,594
11 Claims. (Cl. 340—172.5)

This invention relates generally to modular computer systems of the types disclosed in applicants' copending applications entitled "Modular Computer Systems," Serial No. 121,593, filed on July 3, 1961 and "Modular Computer System Connection Rejection Capability," Serial No. 121,458 filed on July 3, 1961, and more particularly to an improved system characterized by a feature whereby access to certain controlled modules can be restricted to certain preselected controlling modules and by the inclusion of a special controlled module which is capable of responding to commands from a controlling module having access to it, to break connections between other controlling modules and other controlled modules.

In applicants' first above mentioned copending application, a modular computer system is disclosed in which any one of a plurality of controlling modules (defined as programmed devices such as computers) is able to issue a connection command containing the address of any one of a plurality of controlled modules (defined as a nonprogrammed device such as a tape unit). An exchange sense section is responsive to the commands and functions to close a normally open communication path which interconnects the controlling module issuing the command and the controlled module addressed by the command. Although a feature of that system lies in the fact that several different communication paths may be concurrently maintained, it is desirable to prevent the possibility of two different controlling modules being concurrently interconnected with the same controlled module. Accordingly, in applicants' second above mentioned copending application, means are disclosed which have the ability to reject connection commands from controlling modules when the controlled module addressed by the command is "busy" (i.e., already interconnected with a controlling module).

In order to most efficiently utilize the modular computer system concepts described in the two above mentioned copending applications, it is advisable to delegate at least one of the controlling modules to a "master" status and the other controlling modules to a "slave" status. To do this, a master controlling module should have the ability to break any connections coupling any controlling module with any controlled module. This feature initially enables the master module to break "locked-up" connections, under program control, which may result if a module becomes inoperative thereby freeing the module connected to it for other tasks. Perhaps more important, the ability of a master module to break any connections in the system permits the establishment of a priority system so that when necessary, modules can be freed for tasks more important than they were presently working on.

In implementing a "master-slave" relationship, it is, in the preferred embodiment illustrated herein, necessary to restrict access to a special controlled module, designated the "master disconnect" module, to certain preselected controlling modules. The ability to restrict access to certain controlled modules to only those controlling modules which require such access has greater implications however. Initially, it prevents programmed errors or equipment failure from completely disrupting the entire system. Moreover, it is useful in multiuser systems for restricting access to any classified information being stored in the system.

In the light of the above, it is accordingly a general object of this invention to provide a modular computer system in which controlling modules are capable of breaking connections between other controlling modules and other controlled modules in the system.

It is an additional object of this invention to provide in a modular computer system, means for restricting access to certain controlled modules to preselected controlling modules.

Briefly, the invention provides, in a modular computer system, means which enable preselected controlling modules, under program control, to break any established connections within the system and also means for restricting access of controlling modules to controlled modules. More particularly, the invention contemplates providing a special controlled module, designated the "master disconnect" module. Any controlling module which has access to the master disconnect module is capable of issuing a master disconnect command which contains the address of the controlling module to be disconnected. The master disconnect module responds to the command by causing the connection address register associated with the controlling module to be disconnected, to cease holding a connection address. Inasmuch as connections between controlling and controlled modules are maintained only as long as the address of the controlled modules is stored in the controlling module register, the connection is broken. Access to the master disconnect module is restricted to certain preselected modules by providing a special register in which the address of the master disconnect module is stored. Whenever a controlling module issues a connection command, a comparison is made between the addressed controlled module and the address of the master disconnect module. If the connection command addresses the master disconnect module, and if the signal on a restriction line associated with the controlling module is true, the connection command will be rejected meaning that access to the master disconnect module is not available to the controlling module issuing the command. The signal on the restriction line may be established in any of several different manners but herein it is assumed for exemplary purposes that a manual switch is closed to provide the true signal when access is to be prevented.

Other objects and advantages, which will subsequently become apparent, reside in the details of circuitry and operation as more fully hereinafter described and claimed, further reference being made to the accompanying drawings forming a part hereof, wherein like identifying numerals refer to like parts throughout the several figures, and in which:

FIGURE 3 is an enlarged block diagram showing in greater detail the sense units of FIGURE 1.

Figure 1:
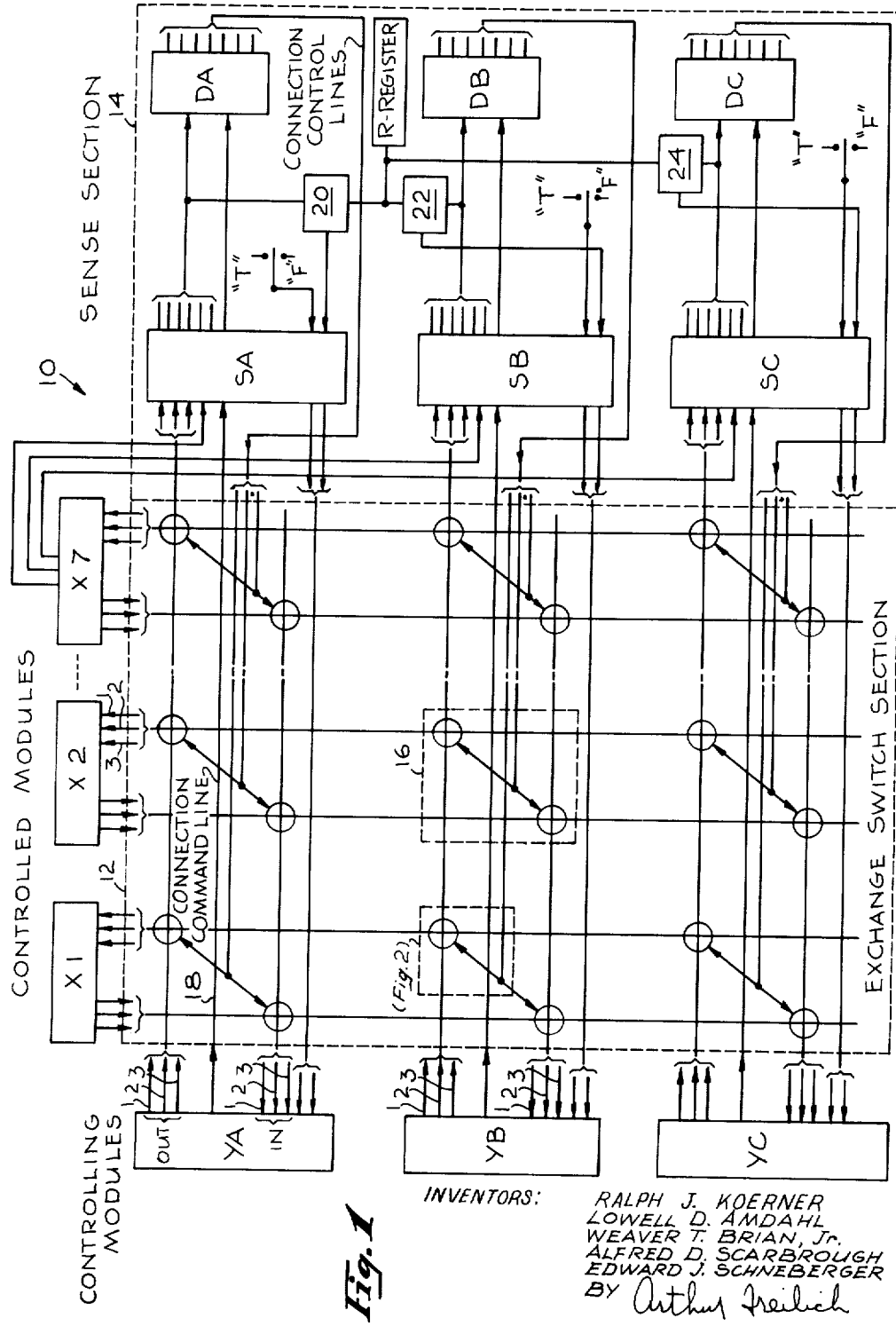
FIGURE 1 is a block diagram of a typical system organized to incorporate the features of the present invention and showing the relationships between the controlling and controlled modules, the exchange, and the sense units.

With continuing reference to the drawings, initial attention is called to FIGURE 1 wherein a modular computer system incorporating the invention herein, is illustrated. Particularly, the system includes an improved exchange 10 including basically two distinct sections; namely, a switch section 12 and a sense section 14.

As disclosed in the previously referred to copending applications, the switch section 12 provides a plurality of normally open informal channels formed by a matrix including a plurality of intersecting electrical conductors interconnected by means 16. The switch section 12 may be considered as possessing two axes to which modules may be connected; that is, the vertical axis (Y axis) having positions therealong to which controlling modules may be connected and the horizontal axis (X axis) having positions therealong to which controlled modules may be connected. In the typical system described herein, controlling modules YA, YB, YC are connected to the switch section 12 respectively, at the first three positions of the vertical axis while controlled modules X1 through X7 are connected, respectively, at positions 1 through 7 of the horizontal axis.

Inasmuch as each controlling module must be capable of communicating with each control module in the system, all modules must be standardized with respect to their information handling abilities. For the sake of simplicity in explanation, the information format utilized will comprise information transfers between modules in words three-bits in length. Accordingly, each of the modules has three output lines and three input lines and each axis of the switch section 12 therefore includes 6 lines multiplied by the number of modules connected to the axis. In addition to the input and output lines, each controlling module is provided with a connection command line 18.

Figure 2:
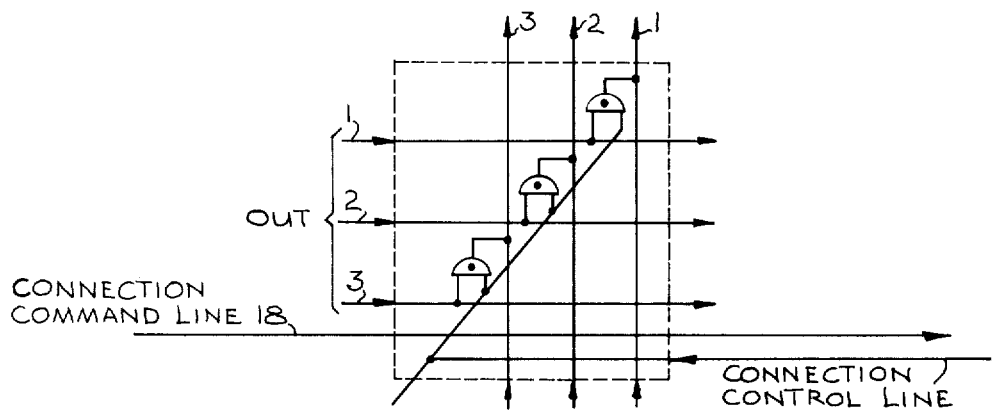
FIGURE 2 is an enlarged schematic view illustrating the details of the circuitry represented by circles in FIGURE 1.

The interconnecting means 16 may be considered as a normally open switch and may comprise "and" gates as shown in FIGURE 2, interconnecting each line from each set of lines on one axis with one line from every set of lines on the other axis. In order for a communication path to exist between a pair of modules, the means 16 interconnecting the set of 6 lines connected to the module on the vertical axis with the set of 6 lines connected to the module on the horizontal axis, must be closed. Accordingly, a complete set (6) of "and" gates must be enabled each time a communication path is established between a pair of modules. The signals enabling an appropriate set of "and" gates are provided on connection control lines connected to connection address decoding networks DA, DB, DC forming a part of the sense section 14.

Each of the controlling modules YA, YB, YC, under program control, is capable of issuing a connection command which uniquely addresses each of the positions on the horizontal axis of the switch section 12. As is well known in digital techniques, information may be represented by using two discrete voltage levels, e.g., a high voltage level may be representative of a "1" or a true condition and a low voltage level of a "0" or a false condition. A connection command is defined as one which sets a connection command line 18 true and applies a connection address to the three output lines with which it is associated. A disconnect command is a special case of a connection command and includes an arbitrarily defined address of all zeroes on the output lines representing a non-existent position on the horizontal axis.

Attention is now called to FIGURE 3 wherein the sense section 14 of FIGURE 1 is illustrated in greater detail. The sense section 14 includes identical sense units SA, SB and SC connected to controlling modules YA, YB, YC, respectively. The sense unit SA connected to controlling module YA includes a three-stage connection address register A and associated gating equipment. Likewise, registers B and C are connected to modules YB and YC, respectively. Inasmuch as the sense units SB and SC are identical to sense unit SA, only the details of the latter are illustrated and the former are represented by dotted boxes. Similarly, since each register includes three identical stages consisting of delay flip-flops (e.g., A1, A2, A3) and appropriate gating, only the details of stage 1 of the A register are illustrated.

Broadly, the system operates such that the connection address registers A, B, C, store the address portion of connection commands and provide appropriate inputs to decoding networks DA, DB, DC, respectively, to energize the connection control lines to enable an appropriate set of switch section "and" gates to establish the communication path designated by the command. However, prior to providing inputs to the decoding networks DA, DB, DC, newly entered addresses in each connection address register are compared with the address existing in the restricted address register R by comparators 20, 22, 24, in order to determine whether or not access to the addressed module is restricted. If the command does designate a restricted address and pre-set means indicate that the restricted address is not available to the commanding controlling module, the command is rejected. The disconnect command which is a special application of the connection command should always be accepted.

More specifically, stage 1 of the connection address register A includes a delay flip-flop A1 having a single input terminal 36 and a pair of complementary output terminals 37, 38. This type of delay flip-flop is well known in the art and functions to provide a true output level $A_1$ on terminal 37 and a complementary false output level $A_1'$ on terminal 38 as long as a true input level $_1a_1$ is present on terminal 36. (This nomenclature will be used with respect to the levels associated with all the flips-flops. As a further example, $_1b_2$ represents a true input level to flip-flop B2 of stage 2 of the B register causing a true output level $B_1$ on terminal 37 and a false output level $B_1'$ on terminal 38. A false input level $_0b_2$ will, of course, establish opposite output levels.) If a false input level $_0a_1$ is then applied to terminal 36, after a predetermined time delay, the output condition will reverse; that is, signal $A_1$ on terminal 37 will be at a false level and signal $A_1'$ on terminal 38 will be at a true level. In the former condition, the flip-flop is said to be true while in the latter, it is said to be false.

Input terminal 36 is connected to the output "or" gate 39 having inputs 40, 41 connected to the outputs of "and" gates 42, 43, respectively. The inputs to "and" gate 43 comprise the connection command line 18 and output line 1 of controlling module YA. (It should be understood that all controlling module output lines are connected in like fashion, e.g., output line 3 of controlling module YB would be connected as an input to "and" gate 43 of stage 3 of the B register.) The inputs to "and" gate 42 comprise line 44 connected to the output of "and" gate 46 and flip-flop A1 output terminal 37.

The connection command line 18 is connected to the input of "and" gate 46 through an inverter 47. Each of the sense units SA, SB, SC include in addition to the flip-flops in the connection address register, delay flip-flops FA, FB, FC, respectively. These latter flip-flops are identical to the flip-flops utilized in the registers and possess an input terminal 48 and output terminals 49 and 50. True level output signals on terminal 49 of flip-flops FA, FB, FC, designated, respectively, $F_a$, $F_b$, $F_c$ exist when the flip-flops are true. True level output signals on terminals 50 designated $F_a'$, $F_b'$, $F_c'$ exist when the flip-flops are false. Terminal 49 of flip-flop FA is connected to the input of "and" gate 46. In addition, disconnect line 53 (connected from the master disconnect module X7, to be discussed below) is connected to the input of "and" gate 46. The output of "or" gate 51 is connected to the input terminal 48 of flip-flop FA. The inputs to "or" gates 51 comprise the output of "and" gate 46 and output of "and" gate 52. The inputs to "and" gate 52 comprise the connection command line 18 and the output of inverter 54 whose input comprises the output of "and" gate 56. The inputs to "and" gate 58 comprise the connection command line 18 and output terminal 49 of flip-flop FA. The inputs to "and" gate 60 comprise the connection command line 18 and the output of "and" gate 56. The "and" gates 59 and 60, respectively, generate signals "command accepted" and "command rejected."

Decoding networks DA, DB, DC are connected to sense units SA, SB, SC, respectively. The decoding networks are identical to each other and are of the type disclosed in the previously mentioned copending applications. Each network includes seven "and" gates whose inputs are unique combinations of the output lines of the flip-flops of the associated connection address register. An "and" gate need not be provided for the combination representing the previously mentioned arbitrarily defined disconnect address. In addition, line 44 is connected as an input to each decoding network "and" gate. Accordingly, when the signal on line 44 is true, the output of only one of the seven "and" gates is set true. All of the network "and" gate output lines constitute connection control lines for enabling sets of "and" gates interconnecting lines in the switch section 12.

When a connection command is issued by any controlling module YA, YB, YC, a determination must be made as to whether the command should be rejected or executed. In order to determine this, a comparison is made, by comparators 20, 22, 24 between the connection address in question and the contents of the restricted address register R. If the address in question appears in the restricted address register R, and if in addition, a signal on restriction line 58 associated with the commanding controlling module has been set true, the command should be rejected. Otherwise, the command should be accepted. The implementation of the rejection criteria is affected by the inputs to "and" gates 56 of the respective sense units SA, SB, SC. A discussion of these inputs will be momentarily deferred until after the operation of the sense units is described. It being presently assumed that a true output from gate 56 means that the requested address is not acceptable and a false output means that it is acceptable. A true level on the output line of gate 56 of sense unit A is designated AR and a false level AR'; likewise, the outputs of gates 56 of sense units SB and SC are respectively BR, BR' and CR, CR'.

When a connection command is issued by module YA, connection command line 18 carries a true level and as a consequence the input to gate 46 through inverter 47 is false causing the signal on line 44 to go false. This causes flip-flops A1, A2, A3 to cease holding any stored address since the output of gate 42 must go false. Since the connection command line 18 is coupled directly to gate 43 along with the controlling module output lines, the address carried by the output lines is inserted into flip-flops A1, A2, A3. If the output of gate 56 is false, both inputs to gate 52 will be true and accordingly flip-flop FA is set true. Since the two inputs to gate 59 are then true, a command accepted signal is issued and coupled back to module YA.

As noted, line 44 is connected as an input to each of the decoding network DA "and" gates. Accordingly, as long as the connection command is being issued by the controlling module YA, the signal on the connection command line 18 is true and the signal on line 44 will be false. Therefore, the decoding network DA will not apply a true signal to one of the connection control lines. However, as soon as the module YA ceases to present the connection command, the signal on line 18 will go false and the signal on line 44 will become true if line 53 is true. Line 53 is connected from the master disconnect module X7 (to be more particularly described below) and the signal thereon is always true except when an established switch section connection is to be broken. As a consequence, one of the seven decoding network DA "and" gates will energize its connection control line in accordance with the address in connection address register A. It will also be realized that when the signal on line 44 becomes true, the output of gate 42 will be true if its associated flip-flop has been set true and false if it has been set false. It will be seen therefore that gate 42 serves to hold the storage content in each register flip-flop after the connection command is no longer presented by the controlling module.

If on the other hand the output of gate 56 is true, the output of inverter 54 will be false. Consequently, the output of gate 52 will be false and accordingly flip-flop FA is set false. Therefore, no command accepted signal is issued by gate 58. However, a command rejected signal is issued by gate 60 inasmuch as line 18 and the output of gate 56 are true. When the module YA ceases to present the connection command, the signal on line 44 will remain false inasmuch as flip-flop FA has been set false. Accordingly, no true signal is presented on any of the connection control lines. Since the signal on line 44 remains false even after the signal on line 18 becomes false, gate 42 will not serve to hold the information stored in the register flip-flops and consequently, each of the register flip-flops is set false representing the previously mentioned arbitrarily defined disconnect address.

The inputs to "and" gate 56 of each sense unit should be implemented according to the rejection criteria desired. It has been pointed out that it is sometimes desirable to prevent particular controlling modules from gaining access to particular controlled modules. If a controlling module issues a connection command addressing a controlled module which is not available to it, the command should be rejected. It has also been pointed out that disconnect commands should always be executed. The outputs of gates 56 of sense units SA, SB, SC have already been designated as AR, BR and CR, respectively. In order to implement the rejection criteria indicated, the following logical functions must be generated:

(1) $AR = [A = R \neq 0] \cdot Ra$
(2) $BR = [B = R \neq 0] \cdot Rb$
(3) $CR = [C = R \neq 0] \cdot Rc$ where R refers to a restricted address register, $R_a$ to a true signal on restriction line 58 of sense unit A, $R_b$ to a true level on restriction line 58 of sense unit SB, and $R_c$ to a true level on restriction line 58 of sense unit SC. Restriction address register R is provided for storing an address corresponding to a position on the horizontal switch axis to which a controlled module is connected to which access is desired to be limited. Addresses may be entered into the register R in any manner desired. In the equations above, $A = R$ means that each bit of the A register is identical to the corresponding bit in the R register. Restriction lines 58 carry either true or false signals depending upon whether or not it is desired that its associated controlling module has access to the address stored in the R register. That is, restriction line 58 is set true if the restricted address is not to be available to its associated controlling module; e.g., a true signal is applied to restriction lines 58 of sense units SB and SC if the controlled module represented by the address stored in register R, is not to be available to controlling modules YB and YC. The means for applying true or false signals to restriction lines 58 may comprise manual switches, registers, etc. In FIGURE 3, a single pole double-throw switch is connected to line 58 and permits selective connection to either a true or false level source. The functions $(A = R \neq 0)$, $(B = R \neq 0)$ and $(C = R \neq 0)$ are generated by comparators 20, 22, 24, respectively. The internal details of comparators capable of generating these functions are well known in the art and comprise arrangements of standard gates.

Equation 1 above means that the output of gate 56 of sense unit SA is true and the address in the A register is accordingly not acceptable if the same non-zero address exists in the R register and the signal on line 58 of sense unit SA is true. Similarly, Equations 2 and 3 mean that the addresses in the B and C registers are not acceptable if the same non-zero address exists in the R register and the signals on their lines 58 are true.

Figure 4:
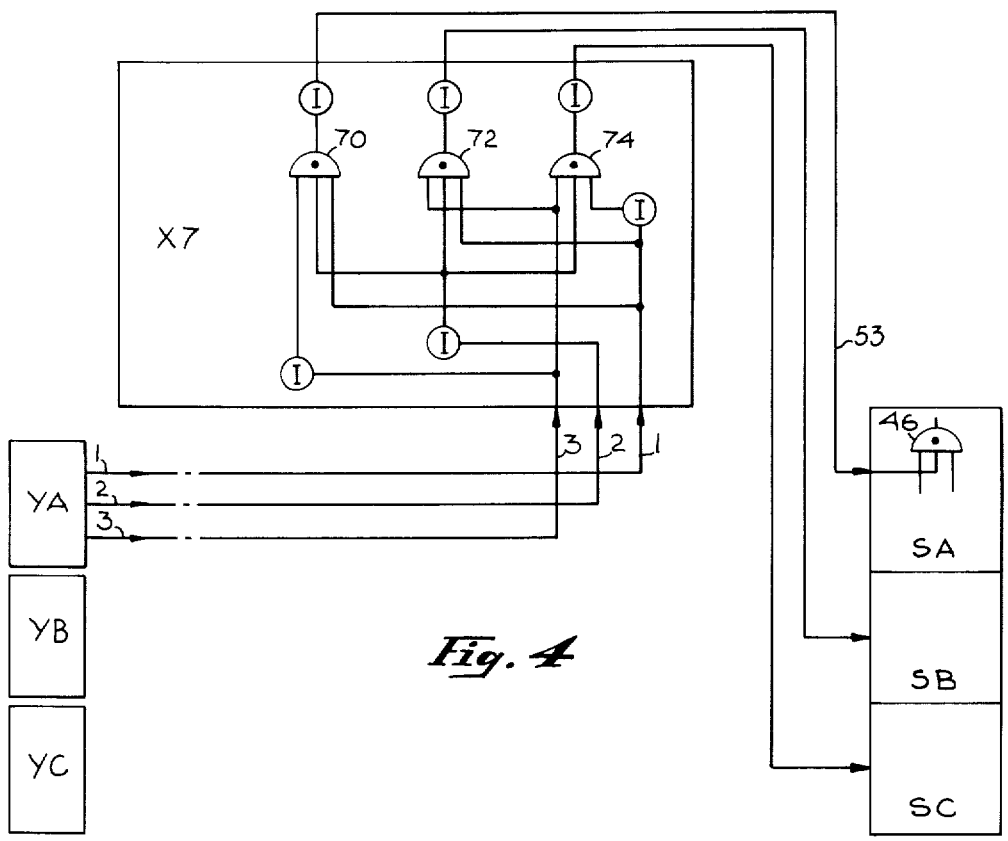
FIGURE 4 is a schematic block diagram illustrating the details of the master disconnect control module and showing particularly the manner in which the master disconnect module is utilized by a controlling module to break connections within the system.

One of the most important functions of this restriction technique is to permit one or more controlling modules to assume a master status in which it is able to break established connections between other controlling modules and other controlled modules. In order to enable a desired controlling module to perform this function, a special controlled module, designated the master disconnect module X7 connected to the switch section at position 7 of the horizontal axis, is provided. Attention is now particularly called to FIGURE 4 wherein the details of the master disconnect module X7 are illustrated. The module X7 includes three "and" gates 70, 72 and 74. The output lines of each of the "and" gates are connected through inverters to the master disconnect line 53 of sense units SA, SB, SC, respectively. From the previous discussion, it should be appreciated that when the signal on line 53 of any sense unit is false, no connection can exist between the controlling module associated with that sense unit and any controlled module. Accordingly, in order for a controlling module, e.g., YA to break a connection in which controlling module YB is involved, it is merely necessary that controlling module YA establish a connection between itself and the master disconnect module X7 and then issue a master disconnect signal which would set the output of "and" gate 72 true and consequently line 53 of sense unit SB false. FIGURE 4 schematically illustrates an already established connection between controlling module YA and master disconnect module X7. By interconnecting the master disconnect modules input lines with "and" gates 70, 72 and 74, as illustrated, it will be appreciated that a true signal on input line 1, a false signal on input line 2, and a true signal on input line 3 will result in a false signal on line 53 of sense unit SB. Likewise, a true signal on input line 1 and a false signal on input lines 2 and 3 will result in line 53 of sense unit SC becoming false.

In order to restrict the master disconnect capability to desired controlling modules, e.g., only YA, it is merely necessary that the address representing position 7 be entered into register R and the signals on lines 58 of sense units SB and SC be made true. By so doing, access to the master disconnect module X7 is restricted to module YA which then alone has the ability to break system connections in which it is not involved.

The foregoing therefore illustrates means, in a modular computer system, which permits one or more of the system controlling modules to break any connections within the system and also means for selectively restricting access between controlling and controlled modules.

The foregoing is considered as illustrative only of the principles of the invention. Since numerous modifications will readily occur to persons skilled in the art, it is not desired to limit the invention to the exact construction and operation shown and described and accordingly all suitable modifications and equivalents are intended to fall within the scope of the invention as claimed.

The following is claimed as new:

1. In a data processing system including a plurality of controlled modules and a plurality of controlling modules wherein each controlling module is capable of providing a plurality of different connection commands each of which uniquely addresses one of said controlled modules; interconnecting means for establishing communication paths between any controlling module and any controlled module in response to said connection commands comprising: a plurality of normally open information channels interconnecting each controlling module with each controlled module; a connection address register associated with each controlling module for storing the address portion of said connection commands; a restricted address register for storing the address of a controlled module to which access is restricted; comparing means for comparing newly entered addresses in said connection address registers with said restricted address; means associated with each controlling module for indicating whether or not access to said restricted address is available to that controlling module; means rejecting said connection commands addressing said restricted address when access to the controlling module issuing said command is not available; and means for closing the normally open information channel interconnecting the commanding controlling module and the addressed controlled module when access is available.

2. A modular computer system including a plurality of controlled modules and a plurality of controlling modules, each controlling module being capable of providing a plurality of connection commands each of which uniquely addresses one of said controlled modules; an exchange for connecting any one of said controlling modules, in response to a connection command therefrom, to an addressed controlled module comprising: a set of conductors connected to each controlled module; a set of conductors connected to each controlling module; normally open means interconnecting each set of controlled module conductors with each set of controlling module conductors; sense means responsive to a connection command for closing said interconnecting means between the set of conductors connected to the controlling module providing said command and the set of conductors connected to the controlled module addressed by said command; register means storing an address identifying one of said controlled modules; means for comparing the controlled module identified by each connection command with the controlled module identified by said address stored in said register means; and means responsive to said means for comparing for preventing the closing of the interconnecting means between the set of conductors connected to the controlling module providing the connection command and the set of conductors connected to the controlled module identified by said address stored in said register means.

3. A data processing system including a plurality of controlled modules and a plurality of stored program controlling modules wherein each controlling module is capable of providing a plurality of different connection command signals each of which is identifiable with one of said controlled modules and a disconnect command signal which is identifiable with no controlled module; interconnecting means for establishing communication paths between any controlling module and any controlled module in response to said connection command signals comprising: a plurality of normally open information channels interconnecting each controlling module with each controlled module; a connection address register associated with each controlling module for storing the address portion of said connection commands; a restricted address register for storing the address of a controlled module to which access is restricted; comparing means for comparing newly entered addresses in said connection address registers with said restricted address; means associated with each controlling module for indicating whether or not access to said restricted address is available to that controlling module; means rejecting said connection commands addressing said restricted address when access to the controlling module issuing said command is not available; means for closing the normally open information channel interconnecting the commanding controlling module and the addressed controlled module when access is available; and means for generating a rejection signal and replacing said newly entered connection address with the address portion of said disconnect command when said connection command is rejected.

4. A data processing system comprising: a plurality of stored program controlling modules; a plurality of controlled modules; each of said controlling modules capable of providing a plurality of different connection command signals each of which is identifiable with one of said controlled modules; means for storing a signal identifying a controlled module to which access is restricted; means for comparing a connection command signal with said signal identifying said module to which access is restricted; means responsive to said comparing means for generating a rejection criteria signal; interconnecting means responsive to said connection command signal for establishing a communication path between the controlling module providing said signal and the controlled module with which said signal is identifiable; and means coupling said rejection criteria signal to said interconnecting means for preventing the establishment of said path.

5. A modular computer system including a plurality of controlled modules and a plurality of programmed controlling modules wherein each controlling module is capable of providing a plurality of connection commands each of which uniquely addresses one of said controlled modules and a plurality of master disconnect signals each of which uniquely identifies one of said controlling modules; means responsive to said connection commands for establishing connections between the commanding controlling module and the addressed controlled module; means for concurrently maintaining a plurality of said connections; and means responsive to master disconnect signals from selected ones of said controlling modules for selectively breaking any established connections which include controlling modules identified by the signals.

6. The system of claim 5 wherein said means responsive to said connection commands includes a connection address register associated with each controlling module into which the address portion of said commands is inserted and a connection address decoding network connected to each connection address register.

7. A modular computer system including a plurality of controlled modules and a plurality of programmed controlling modules wherein each controlling module is capable of providing a plurality of connection commands each of which uniquely addresses one of said controlled modules and a plurality of master disconnect signals each of which uniquely identifies one of said controlling modules; means responsive to said connection commands for establishing connections between the commanding controlling module and the addressed controlled module; means for concurrently maintaining a plurality of said connections; means responsive to master disconnect signals from selected ones of said controlling modules for selectively breaking any established connections which include controlling modules identified by the signals; said means responsive to said connection commands including a connection address register associated with each controlling module into which the address portion of said commands is inserted and a connection address decoding network connected to each connection address register; said means responsive to said master disconnect signals comprising a controlled master disconnect module including an address decoding network; and means operatively coupling the output of said master disconnect module network to said connection address registers for clearing selected connection address registers in response to said master disconnect signals.

8. A modular computer system including a plurality of controlled modules and a plurality of programmed controlling modules wherein each controlling module is capable of providing a plurality of connection commands each of which uniquely addresses one of said controlled modules; means responsive to said connection commands for establishing connections between the commanding controlling module and the addressed controlled module; means for concurrently maintaining a plurality of said connections; register means storing an address defining one of said controlled modules; means for comparing the controlled module identified by each connection command with the controlled module identified by said address stored in said register means; and means responsive to said means for comparing for preventing the establishment of connections between the controlling module providing the connection command and the controlled module identified by the address stored in said register means.

9. A modular computer system including a plurality of controlled modules and a plurality of programmed controlling modules wherein each controlling module is capable of providing a plurality of connection commands each of which uniquely addresses one of said controlled modules; means responsive to said connection commands for establishing connections between the commanding controlling module and the addressed controlled module; means for concurrently maintaining a plurality of said connections; means preventing the establishment of connections between certain preselected controlling modules and certain preselected controlled modules; said means responsive to said connection commands including a connection address register associated with each controlling module into which the address portion of said commands is inserted and a connection address decoding network connected to each connection address register; said means for preventing the establishment of connections comprising means for storing information identifying a controlled module to which connection is to be prevented; comparing means for comparing newly entered address portions in said connection address registers with said information; indicating means associated with each controlling module for indicating whether connection with that particular controlling module is to be prevented; and means responsive to said comparing means and said indicating means for controlling the operative coupling between said connection address register and said connection address decoding network associated with each controlling module.

10. A modular computer system including a plurality of controlled modules and a plurality of programmed controlling modules wherein each controlling module is capable of providing a plurality of connection commands each of which uniquely addresses one of said controlled modules and a plurality of master disconnect signals each of which uniquely identifies one of said controlling modules; means responsive to said connection commands for establishing connections between the commanding controlling module and the addressed controlled module; means for concurrently maintaining a plurality of said connections; a controlled master disconnect module responsive to said master disconnect signals for breaking connections of the controlling modules identified by the signals; and means preventing the establishment of connections between certain preselected controlling modules and said controlled master disconnect module.

11. A modular computer system including a plurality of controlled modules and a plurality of programmed controlling modules wherein each controlling module is capable of providing a plurality of connection commands each of which uniquely addresses one of said controlled modules and a plurality of master disconnect signals each of which uniquely identifies one of said controlling modules; means responsive to said connection commands for establishing connections between the commanding controlling module and the addressed controlled module; means for concurrently maintaining a plurality of said connections; a controlled master disconnect module responsive to said master disconnect signals for breaking connections of the controlling modules identified by the signals; means preventing the establishment of connections between certain preselected controlling modules and said controlled master disconnect module; said means responsive to said connection commands including a connection address register associated with each controlling module into which the address portion of said commands is inserted and a connection address decoding network connected to each connection address register; said means for preventing the establishment of connections comprising means for storing the address of said master disconnect module; comparing means for comparing newly entered address portions in each connection address register with said master disconnect module address; means associated with each controlling module for indicating whether connection with that particular controlling module is to be prevented; and means responsive to said comparing means and said indicating means for controlling the operative coupling between said connection address register and said connection address decoding network associated with each controlling module.

References Cited by the Examiner

UNITED STATES PATENTS

| | | | |
|---|---|---|---|
| 2,283,999 | 5/1942 | Kozma et al. | 235—150 |
| 2,528,101 | 10/1950 | Williams | 235—61.6 |
| 2,538,636 | 1/1951 | Williams | 235—61.1 |
| 2,588,923 | 3/1952 | Hatton | 235—157 |
| 2,910,238 | 10/1959 | Miles et al. | 235—157 X |
| 2,951,234 | 8/1960 | Spielberg et al. | 340—172.5 |
| 3,017,092 | 1/1962 | Rent et al. | 235—157 X |

OTHER REFERENCES

Pages 48 to 58, December 1959—Bloch: "The Engineering Design of the Stretch Computer," Proceedings of the Eastern Joint Computer Conference.

Pages 59 to 65, December 1959—Eckert et al.: "Design of Univac—LARC System: 1," Proceedings of the Eastern Joint Computer Conference.

ROBERT C. BAILEY, *Primary Examiner.*

WALTER W. BURNS, JR., MALCOLM A. MORRISON,
*Examiners.*